United States Patent
Bucher et al.

(10) Patent No.: US 10,519,878 B2
(45) Date of Patent: Dec. 31, 2019

(54) DRIVE SYSTEM WITH EXPANDER SHUT OFF UPON DETECTION OF A LEAK

(71) Applicant: Mahle International GmbH, Stuttgart (DE)

(72) Inventors: Michael Bucher, Berlin (DE); Florian Fuchs, Steinheim (DE); Roland Lochmann, Marbach (DE); Hannes Marlok, Leonberg (DE); Peter Wieske, Korntal-Muenchingen (DE)

(73) Assignee: Mahle International GmbH (DE)

( * ) Notice: Subject to any disclaimer, the term of this patent is extended or adjusted under 35 U.S.C. 154(b) by 107 days.

(21) Appl. No.: 15/807,554

(22) Filed: Nov. 8, 2017

(65) Prior Publication Data
US 2018/0128191 A1 May 10, 2018

(30) Foreign Application Priority Data

Nov. 9, 2016 (DE) .................. 10 2016 222 020

(51) Int. Cl.
*F02B 67/06* (2006.01)
*F02F 7/00* (2006.01)
(Continued)

(52) U.S. Cl.
CPC .............. *F02D 29/00* (2013.01); *F02B 37/20* (2013.01); *F02B 41/10* (2013.01); *F02B 67/06* (2013.01);
(Continued)

(58) Field of Classification Search
CPC ...... F01K 23/065; F01K 23/14; Y02T 10/166; Y02T 10/144; F02D 2041/225; F02B 37/00–24
(Continued)

(56) References Cited

U.S. PATENT DOCUMENTS 6,079,379 A * 6/2000 Cobb, Jr. .................. F02D 7/02
123/73 B
7,913,676 B2 * 3/2011 Breuninger .......... F01M 13/028
123/572
(Continued)

FOREIGN PATENT DOCUMENTS

CH         304496 A      1/1955
DE    102010001118 A1    7/2011
(Continued)

OTHER PUBLICATIONS

English abstract for DE-102014225059.
English abstract for JP-2014-47676.
English abstract for DE-102015224128.

*Primary Examiner* — Laert Dounis
(74) *Attorney, Agent, or Firm* — Fishman Stewart PLLC

(57) ABSTRACT

A drive system may include an internal combustion engine and an expander operated via a working medium. A force transmission device may be disposed between a crankcase and the expander. A first seal may be disposed between the expander and the force transmission device and/or a second seal may be disposed between the force transmission device and the crankcase. A crankcase ventilation line may lead from the crankcase into an intake pipe of the internal combustion engine. An air mass sensor may be disposed in the intake pipe. An engine control unit may be in communication with the air mass sensor, the expander, and the internal combustion engine and may be configured to detect a power of the internal combustion engine and an air mass flow of the air mass sensor and may switch off the expander if a power suddenly rises with the air mass flow remaining constant.

20 Claims, 3 Drawing Sheets

(51) Int. Cl.
  *F02B 37/20* (2006.01)
  *F02B 41/10* (2006.01)
  *F02D 41/22* (2006.01)
  *F02D 29/00* (2006.01)
  *F02B 63/04* (2006.01)

(52) U.S. Cl.
  CPC .......... *F02F 7/0043* (2013.01); *F02F 7/0068* (2013.01); *F02B 63/04* (2013.01); *F02D 2041/225* (2013.01); *F02D 2700/09* (2013.01); *Y02T 10/144* (2013.01); *Y02T 10/163* (2013.01)

(58) Field of Classification Search
  USPC .................................................. 60/698–721
  See application file for complete search history.

(56) References Cited

U.S. PATENT DOCUMENTS

| | | | |
|---|---|---|---|
| 8,439,022 B2 * | 5/2013 | Ruppel | F01M 13/022 123/572 |
| 2011/0179793 A1 | 7/2011 | Stegmaier et al. | |
| 2015/0330261 A1 * | 11/2015 | Held | F01D 11/003 60/326 |
| 2017/0328247 A1 * | 11/2017 | Calkin | F02B 37/18 |
| 2017/0335783 A1 * | 11/2017 | Cakallik | F01K 23/065 |

FOREIGN PATENT DOCUMENTS

| | | |
|---|---|---|
| DE | 102014225059 A1 | 6/2016 |
| DE | 102015224128 A1 | 6/2017 |
| JP | 2014-47676 A | 3/2014 |

\* cited by examiner

DRIVE SYSTEM WITH EXPANDER SHUT OFF UPON DETECTION OF A LEAK

CROSS-REFERENCE TO RELATED APPLICATIONS

This application claims priority to German Patent Application No. DE 10 2016 222 020.9 filed on Nov. 9, 2016, the contents of which is hereby incorporated by reference in its entirety.

TECHNICAL FIELD

The present invention relates to a drive system with an internal combustion engine and an expander. The invention, additionally, relates to an operating method of such a drive system.

BACKGROUND

Drive systems with internal combustion engine and expander coupled with the same are known from the prior art and are to be increasingly employed also in the field of a mobile application such as for example a motor vehicle. Since for driving the expander a combustible working medium is often employed, which is optimal both ecologically and also economically, a particularly good sealing of the individual components, in particular in the region of a shaft passage to the internal combustion engine or into the surroundings has to be ensured.

SUMMARY

The present invention therefore deals with the problem of stating an improved embodiment for a drive system of the generic type, which is characterized in particular by an increased functional reliability.

According to the invention, this problem is solved through the subject of the independent claim(s). Advantageous embodiments are subject of the dependent claims.

With a drive system having an internal combustion engine and an expander operated by means of a combustible working medium, the present invention is based on the general idea of monitoring for the first time a leakage of the working medium and to directly shut off the expander when a leakage of working medium is detected in order to reduce a further leakage of working medium at least so far as possible or to prevent at least an undesirable leakage of working medium into the environment. The drive system according to the invention comprises an internal combustion engine and the previously mentioned expander, wherein a crankcase ventilation line is provided, which leads from the crankcase into an intake pipe of the internal combustion engine. In the intake pipe upstream of the junction of the crankcase ventilation line an air mass sensor is arranged. Between a crankcase of the internal combustion engine and the expander a power transmission device is arranged in this case, wherein between the expander and the power transmission device a first seal and/or between the power transmission device and the crankcase of the internal combustion engine a second seal is/are arranged. Because of this, a sealing of the driveshaft of the expander, of the shaft guiding in the power transmission device and the shaft crossing into the crankcase is brought about. Likewise provided is an engine control unit which is communicatingly connected to the air mass sensor, the expander and the internal combustion engine. Here, the engine control unit is designed in such a manner that it detects a power of the internal combustion engine and an air mass flow of the air mass sensor and shuts off the expander provided the detected power with air mass flow remaining the same rises suddenly and because of this a transfer of combustible working medium, i.e. a leakage, from the expander into the crankcase and from the same via the crankcase ventilation line into the intake pipe can be concluded. Because of the fact that the air mass sensor is positioned upstream of the junction of the crankcase ventilation line in the intake pipe the working medium leaking out of the expander is not taken into account with the air mass flow. The suddenly increasing power of the internal combustion engine in this case can be put into a conceivably simple relationship with the leakage of combustible working medium provided the remaining components, i.e. mainly the air mass flow, remain constant. According to the drive system according to the invention, a leakage of combustible working medium can thus not only be reliably detected but at the same time a suitable countermeasure, namely the shutdown of the expander, initiated, wherein the engine control unit in the drive system according to the invention utilises sensors that are already present anyway both in the internal combustion engine and also in the intake pipe for the new function according to the invention, since both a sensor detecting the power of the internal combustion engine and also an air mass sensor have already been provided in the past. Thus, a failsafe function can be cost-effectively and extremely reliably offered with the drive system according to the invention. Even in the case that the leaking quantity of working medium is not sufficient for being detected, this is at least rendered harmless by way of the combusting in the internal combustion engine.

In an advantageous further development of the invention, the power transmission device for example is designed as a gearwheel, as a chain drive, as a transmission or as a belt drive and brings about a mechanical coupling of the expander to the internal combustion engine. Even this incomplete enumeration gives an idea of the manifold embodiments of the power transmission device that are possible.

In an advantageous further development of the solution according to the invention, the expander is designed as an axial piston machine, as a scroll or as a turbine. Such an axial piston machine, as scroll or a turbine can be embedded for example in a heat recovery system, as a result of which heat generated by the internal combustion engine and which otherwise would be given off into the environment without further utilisation can be utilised for power generation. By way of such a heat recovery system, combined with expander and the internal combustion engine, the efficiency of the drive system according to the invention can be increased.

Practically, the combustible working medium comprises ethanol, cyclopentane or acetone. Ethanol constitutes a comparatively cost-effective and at the same time an environmentally compatible embodiment of a working medium, while cyclopentane and acetone have an elevated efficiency due to a lower condensation temperature. In addition, cyclopentane and acetone have a good compatibility with aluminium as a result of which system costs compared with ethanol can be reduced. Acetone in turn has an improved compatibility with sealing materials.

In an advantageous further development of the solution according to the invention, exclusively one first seal is provided and therefore the power transmission device lubricated by way of lubricant from the crankcase, for example oil. Because of this a comparatively simple lubrication of the power transmission device can be achieved through the engine oil that is present in the internal combustion engine anyway. Alternatively to this it is also conceivable that exclusively a second seal is provided and the power transmission device is lubricated by way of the working medium of the expander. In turn it is also conceivable, alternatively, that both a first and also a second seal are provided and the power transmission device is lubricated with grease for life.

In a further advantageous embodiment of the solution according to the invention, both a first and a second seal are provided as well as a drain pipe which leads into an aftertreatment device arranged in an exhaust gas system of the internal combustion engine, so that in this case working medium which undesirably passed from the expander into the power transmission device can be drained via the drain pipe into the exhaust gas aftertreatment device and for example combusted there.

Practically, a working medium sensor is arranged in the power transmission device and the engine control unit additionally designed in such a manner that it shuts off the expander provided the working medium sensor detects working medium in the power transmission device. Obviously, the engine control unit in this case is additionally communicatingly coupled to the working medium sensor in the power transmission device and at least one first seal is present between the expander and the power transmission device. This constitutes a particularly advantageous embodiment of the drive system according to the invention, since in this case for example the expander can be shut off already at the time at which a passing of working medium into the power transmission device is detected. In this case, the second seal for example—if present—can still be intact so that a passing of working medium from the power transmission device into the internal combustion engine has not even taken place yet.

In a further advantageous embodiment, at least one first seal is provided, wherein the power transmission device comprises a housing which is connected to the intake pipe via a connection pipe downstream of the air mass sensor. In this case, too, a leakage of the first seal and thus an undesirable passing of working medium into the housing of the power transmission device is associated with an increase of power of the internal combustion engine with the air mass flow remaining the same and can be detected.

In an embodiment which is not covered by the invention, the expander is not directly mechanically coupled to the internal combustion engine but arranged separately regarding the same and coupled to a generator for generating electric energy via a third seal. The generator comprises a generator housing which is connected to the intake pipe via a feed line downstream of the air mass sensor. By way of this, a leakage of the third seal and thus an undesirable passing of working medium into the housing of the generator and from the same into the intake pipe via the feed line is associated with an increase of power of the internal combustion engine with the air mass flow remaining the same and can be detected and countermeasures taken if required.

The present invention is based, furthermore, on the general idea of stating an operating method of such a drive system in which the engine control unit detects or monitors a power of the internal combustion engine and an air mass flow in an intake pipe and directly shuts off the expander provided the detected power of the internal combustion engine rises suddenly with the air mass flow remaining the same, since in this case a passing of working medium from the expander into the intake pipe can be concluded.

In an advantageous further development of the operating method according to the invention, the engine control unit can shut off the expander provided the working medium sensor detects working medium in the power transmission device. Obviously, at least the first seal has to be provided in this case, alternatively it is conceivable that both a first and also a second seal are provided.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar or functionally same components.

BRIEF DESCRIPTION OF THE DRAWINGS

There it shows, in each case schematically.

DETAILED DESCRIPTION

Figure 1:
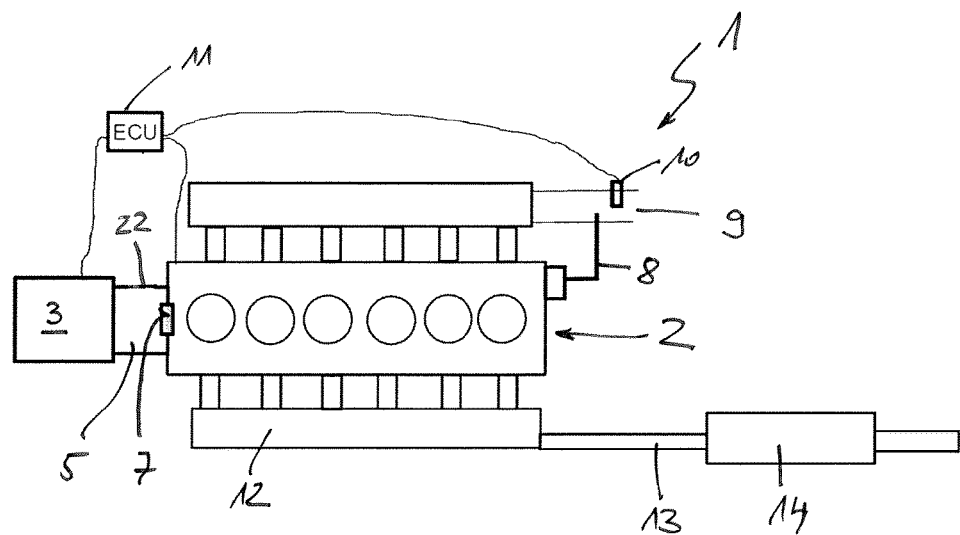
FIG. 1 a drive system according to the invention with a second seal.
Figure 2:
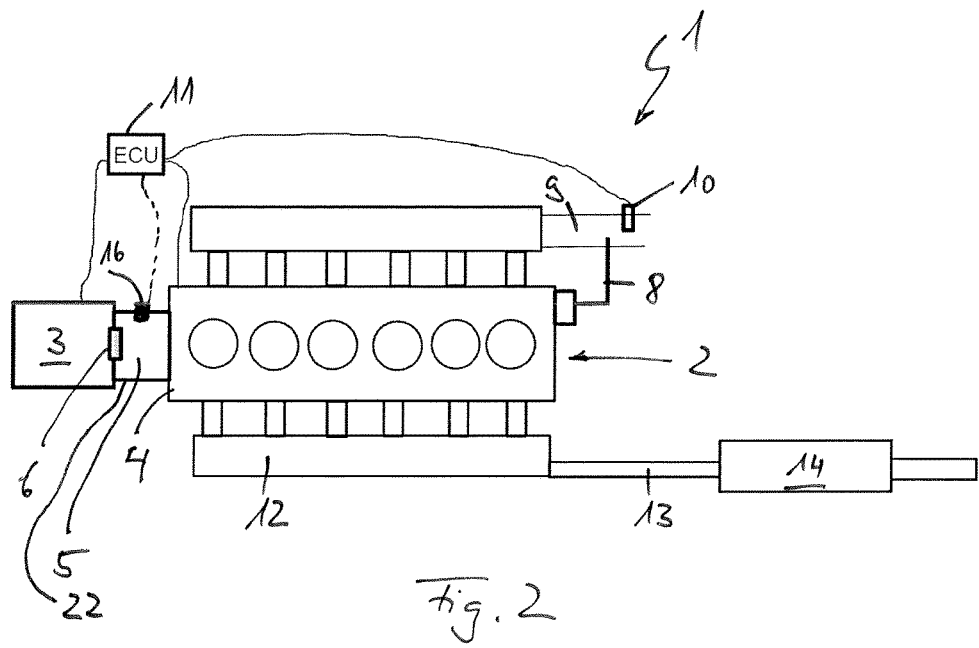
FIG. 2 an alternative embodiment of the drive system according to the invention with exclusively one first seal.

According to FIGS. 1 to 5, a drive system 1 according to the invention comprises an internal combustion engine 2 and an expander 3 that is operated with a combustible working medium. The reference characters for FIGS. 1 to 5 in this case equally apply also to FIG. 6. Between a crankcase 4 of the internal combustion engine 2 and the expander 3, a power transmission device 5 is arranged in the embodiments of FIGS. 1 to 5, wherein between the expander 3 and the power transmission device 5 a first seal 6, in particular a first shaft seal 6, is arranged (see FIGS. 2 to 5). Additionally or alternatively, a second seal 7 can be arranged between the power transmission device 5 and the crankcase 4 of the internal combustion engine 2 (see FIGS. 1 and 3 to 5). Likewise provided is a crankcase ventilation line 8 which leads from the crankcase 4 of the internal combustion engine 2 into an intake pipe 9 of the internal combustion engine 2. In this intake pipe 9, an air mass sensor 10 is arranged upstream of the junction of the crankcase ventilation line 8. In addition to this, an engine control unit 11 which is connected to the air mass sensor 10, the expander 3 and the internal combustion engine 2 is provided. Provided the first seal 6 and/or the second seal 7 are okay, the internal combustion engine 2 is separated hermetically sealed from the expander 3. According to the invention, this engine control unit 11 (ECU) is now designed in such a manner that it detects a power of the internal combustion engine 2 and an air mass flow in the intake pipe 9 and shuts off the expander 3, which can be designed for example as an axial piston machine or as a turbine, provided the detected power of the internal combustion engine 2 rises suddenly with the air mass flow in the intake pipe 9 remaining the same and because of this a passing of working medium from the expander 3 via the intake pipe 9 into the internal combustion engine 2 can be concluded. A sudden increase of the power of the internal combustion engine 2 with otherwise same parameters, i.e. for example with same air mass flow in the intake pipe 9, can exclusively occur in particular provided that additional combustible material, i.e. for example combustible working medium is fed to the internal combustion engine. A sudden increase of the power of the internal combustion engine 2 thus unambiguously points to a leakage of the first seal 6 and/or of the second seal 7 in the embodiments of FIGS. 1 to 5.

The working medium can for example comprise ethanol, cyclopentane or acetone, wherein in particular ethanol is considered more volatile and uncritical in terms of environmental aspects.

Looking at the individual embodiments of the drive system 1 according to the invention it can now be seen that in the case of the drive system 1 according to FIG. 1 merely a second seal 7 is arranged between the internal combustion engine 2, or between its crankcase 4 and the power transmission device 5. In this case, the power transmission device 5 is lubricated via the working medium of the expander 3. In an alternative embodiment, as is shown for example according to FIG. 2, exclusively a first seal 6 is provided between the expander 3 and the power transmission device 5, wherein in this case the power transmission device 5 is also lubricated via the lubricant, for example the oil, from the crankcase 4 of the internal combustion engine 2. Again alternatively to this, the drive system 1 can comprise both the first seal 6 and also the second seal 7 and the power transmission device 5 is lubricated with grease for life (see FIGS. 3 to 5).

In all embodiments of the drive system 1 according to the invention, the internal combustion engine 2 is communicatingly connected to an exhaust gas system 13 via an exhaust manifold 12, wherein in the exhaust gas system 13 an exhaust gas aftertreatment device 14, for example a filter or a catalytic converter is arranged.

Figure 4:
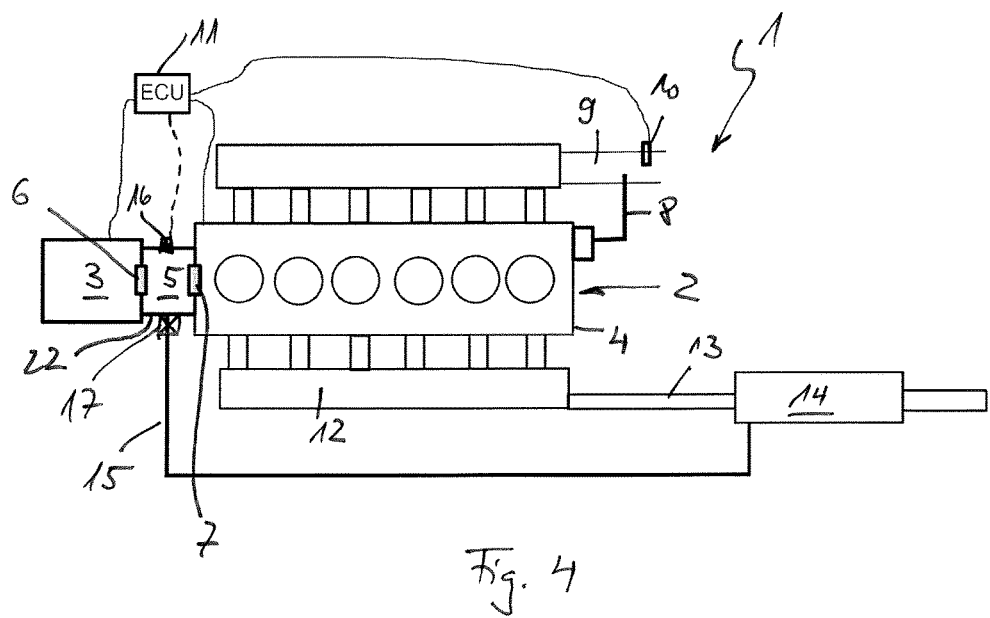
FIG. 4 a representation as in FIG. 3, however additionally with a drain pipe.

Looking at the drive system 1 according to FIG. 4, the same comprises both a first seal 6 and also a second seal 7, wherein additionally a drain pipe 15 is provided, which on the inlet side is connected to the power transmission device 5 and at the outlet side to the exhaust gas aftertreatment device 14 and via which the working medium can be drained from the power transmission device 5 into the exhaust gas aftertreatment device 14. In this case, a leakage of working medium from the expander 3, for example the axial piston machine or the turbine, additionally prevented from entering the internal combustion engine 2 by both the second seal 7 and also by the drain pipe 15.

Figure 5:
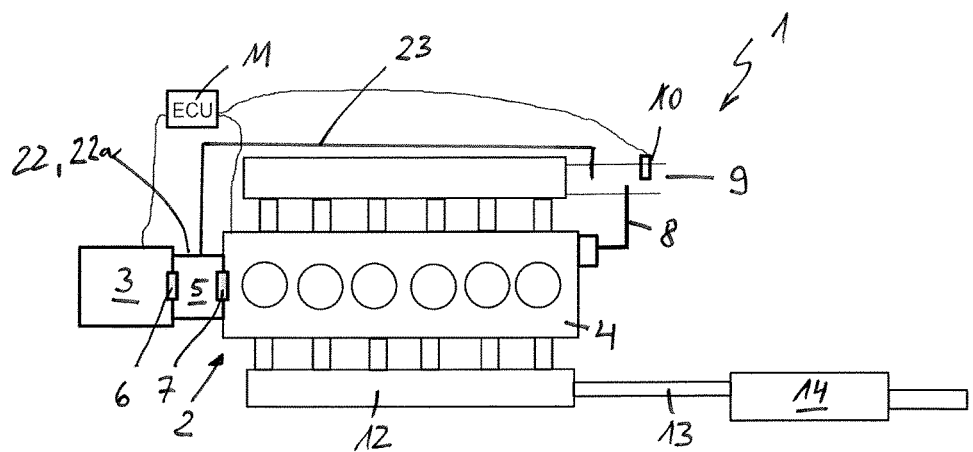
FIG. 5 a representation as in FIG. 3, however additionally with a connection pipe from the fourth transmission device to the intake pipe.

Looking at the drive system 1 according to FIG. 5, the same likewise comprises a first seal 6 and also a second seal 7, wherein at least the first seal 6 has to be present. In addition, the power transmission device 5 in this embodiment comprises a housing 22*a*, which is connected to the intake pipe 9 via a connection pipe 23 downstream of the air mass sensor 10. In this case, a leakage of the first seal 6 and thus an undesirable passing of working medium into the housing 22, 22*a* of the power transmission device 5 is also associated with an increase in power of the internal combustion engine 2 with the air mass flow remaining the same and can be detected.

Independently of the selected embodiment, the housing 22, 22*a* of the power transmission device 5 is hermetically sealed relative to the crankcase 4 of the internal combustion engine 2 and the expander 3, so that even with a for example merely tubular housing 22, 22*a* a tight connection of the same both to the crankcase 4 and also the expander 3 is provided.

Figure 6:
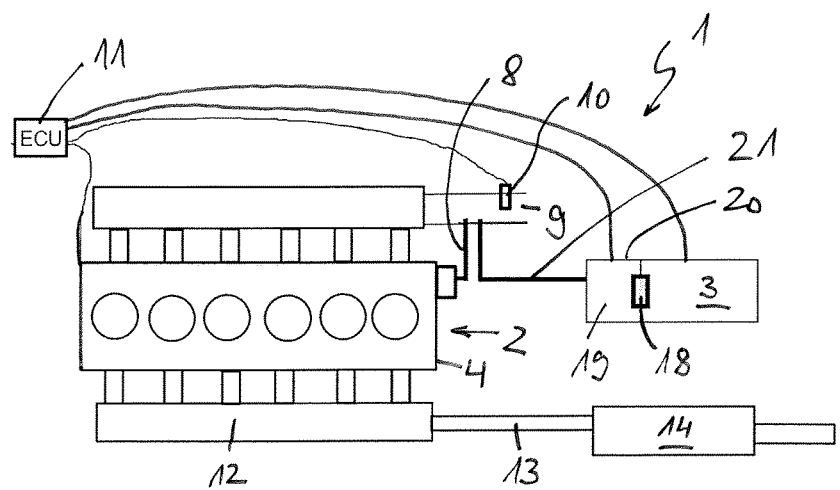
FIG. 6 an embodiment which is not covered by the invention with separately arranged expander.

Looking at the embodiment of FIG. 6 it is evident that the expander 3 is not directly mechanically coupled to the internal combustion engine 2 but arranged separately from the same and mechanically coupled, via a third seal 18, to a generator 19 for generating electric energy. The generator 19 comprises a generator housing 20 which is connected to the intake pipe 9 via a feed line 21 downstream of the air mass sensor 10. By way of this, a leakage of the third seal 18 and thus an undesirable passing of working medium into the housing 20 of the generator 19 and from the same via the feed line 21 into the intake pipe 9 is associated with an increase of power of the internal combustion engine 2 with the air mass flow remaining the same and can be detected and countermeasures taken if required. Countermeasure in this case is also a shutdown of the expander 3 by the engine control unit 11 which is communicatingly connected to the generator 19 and the expander 3.

Looking for example at FIGS. 2 to 5, at least the first seal 6 is provided in each of these drive systems 1 and a working medium sensor 16 additionally arranged in the power transmission device 5. In this case, the engine control unit 11 is additionally designed in such a manner that it shuts off the expander provided that this working medium sensor 16 detects working medium, i.e. for example ethanol or cyclopentane in the power transmission device 5. This working medium sensor 16 can also trigger a premature shutdown of the expander 3 namely in a state in which the working medium has not entered the crankcase 4 of the internal combustion engine 2 by way of the second seal 7.

Figure 3:
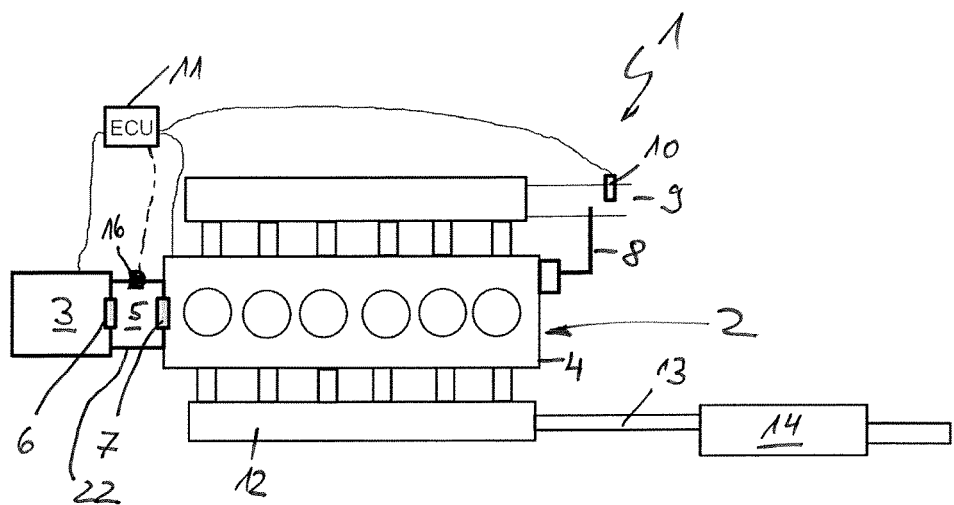
FIG. 3 a further alternative embodiment with a first and a second seal.

Obviously, the working medium sensor 16 can also be provided with completely encapsulated power transmission device 5, as has been shown for example according to FIGS. 3 and 4. In the embodiment according to FIG. 4 it is additionally conceivable that the engine control unit 11 is designed in such a manner that the same switches off a valve 17, i.e. opens the same, provided the working medium sensor 16 detects working medium in the power transmission device 5 and consequently discharges the same via the drain pipe 15 into the exhaust gas aftertreatment device 14, for example the catalytic converter, where it is combusted.

The power transmission device 5 can be designed for example as a transmission in particular also with a freewheel or as a clutch.

Here, the drive device 1 according to the invention can be controlled or regulated via an associated operating method, wherein in the case of this operating method the engine control unit 11 detects a power of the internal combustion engine 2 and an air mass flow of the air mass sensor 10 and shuts off the expander 3 provided the detected power suddenly rises with the air mass flow otherwise remaining the same and because of this a passing of working medium from the expander 3 into the internal combustion engine 2 can be concluded.

Such a passing of working medium, i.e. of combustible working medium, thus always points to a leakage of the first seal 6 and/or of the second seal 7 (see FIGS. 1 to 5), or of the third seal 18 (see FIG. 6), so that the operating method according to the invention initiates the failsafe mode. In the same manner or additionally or even alternatively, the engine control unit 11 with the operating method according to the invention can shut off the expander 3 provided the working medium sensor 16 detects working medium in the power transmission device 5.

All embodiments of FIGS. 1 to 5 have in common that both the drive system according to the invention and also the operating method according to the invention make possible detecting an undesirable leakage of working medium and taking appropriate countermeasures, i.e. a shutdown of the expander 3 and thus at least minimising preferentially eliminating a further pressurised feeding of working medium into the internal combustion engine 2 or its crankcase 4 or the environment.

The invention claimed is:

1. A drive system comprising:
    an internal combustion engine and an expander operated via a combustible working medium;
    a power transmission coupling disposed between a crankcase of the internal combustion engine and the expander;
    at least one of a first seal disposed between the expander and the power transmission coupling and a second seal disposed between the power transmission coupling and the crankcase;
    a crankcase ventilation line leading from the crankcase into an intake pipe of the internal combustion engine;
    an air mass sensor disposed in the intake pipe upstream of a junction of the crankcase ventilation line;
    an engine control unit communicatingly connected to the air mass sensor, the expander and the internal combustion engine; and
    the engine control unit configured to detect a power of the internal combustion engine and an air mass flow of the air mass sensor and to shut off the expander if the power detected suddenly rises with the air mass flow remaining constant to reduce a leakage of the combustible working medium from the expander into the internal combustion engine.

2. The drive system according to claim 1, wherein the expander is configured as one of an axial piston machine, a scroll and a turbine.

3. The drive system according to claim 1, wherein the combustible working medium comprises ethanol, cyclopentane or acetone.

4. The drive system according to claim 1, wherein the power transmission coupling includes a housing sealed relative to the crankcase of the internal combustion engine and the expander.

5. The drive system according to claim 1, wherein one of:
    the first seal is exclusively provided and the power transmission coupling is lubricated via oil from the crankcase;
    the second seal is exclusively provided and the power transmission coupling is lubricated via the combustible working medium of the expander; and
    the first seal and the second seal are provided.

6. The drive system according to claim 1, wherein
    the first seal and the second seal are provided;
    the internal combustion engine includes an exhaust system having an exhaust gas aftertreatment device comprising a filter or a catalytic converter; and
    a drain pipe structured and arranged to drain the combustible working medium from the power transmission coupling into the exhaust gas aftertreatment device, the drain pipe having an inlet side connected to the power transmission coupling and an outlet side connected to the exhaust gas aftertreatment device.

7. The drive system according to claim 1, wherein
    the first seal is provided; and
    the power transmission coupling includes a housing connected to the intake pipe via a connection pipe downstream of the air mass sensor.

8. The drive system according to claim 1, wherein
    the first seal is provided;
    a working medium sensor is disposed in the power transmission coupling; and
    the engine control unit is configured to shut off the expander if the working medium sensor detects the combustible working medium in the power transmission coupling.

9. The drive system according to claim 1, wherein the power transmission coupling is a gearwheel, a transmission, a belt drive, or a chain drive.

10. The drive system according to claim 1, wherein the at least one of the first seal and the second seal is a shaft seal.

11. The drive system according to claim 1, wherein the combustible working medium comprises ethanol.

12. The drive system according to claim 1, wherein the combustible working medium comprises cyclopentane.

13. The drive system according to claim 1, wherein the combustible working medium comprises acetone.

14. The drive system according to claim 1, wherein the first seal is exclusively provided and the power transmission coupling is lubricated via oil from the crankcase.

15. The drive system according to claim 1, wherein the second seal is exclusively provided and the power transmission coupling is lubricated via the combustible working medium of the expander.

16. The drive system according to claim 1, wherein the first seal and the second seal are provided.

17. An operating method of a drive system comprising:
    providing an internal combustion engine and an expander operated via a combustible working medium; a power transmission coupling disposed between a crankcase of the internal combustion engine and the expander; at least one of a first seal disposed between the expander and the power transmission coupling and a second seal disposed between the power transmission coupling and the crankcase; a crankcase ventilation line leading from the crankcase into an intake pipe of the internal combustion engine; an air mass sensor disposed in the intake pipe upstream of a junction of the crankcase ventilation line; an engine control unit operatively connected to the air mass sensor, the expander and the internal combustion engine; and
    monitoring a power of the internal combustion engine and an air mass flow from the air mass sensor via the engine control unit, and shutting off the expander in response to detecting a sudden power rise in the internal combustion engine while the air mass flow remains constant to reduce a passing of the combustible working medium from the expander into the internal combustion engine.

18. The operating method according to claim 17, wherein the engine control unit shuts off the expander in response to detecting via a working medium sensor the combustible working medium in the power transmission coupling.

19. A drive system comprising:
    an internal combustion engine;
    an expander operated via a combustible working medium;

a power transmission coupling disposed between a crankcase of the internal combustion engine and the expander;
a working medium sensor disposed in the power transmission coupling;
a first seal disposed between the expander and the power transmission coupling and a second seal disposed between the power transmission coupling and the crankcase;
a crankcase ventilation line leading from the crankcase into an intake pipe of the internal combustion engine;
an air mass sensor disposed in the intake pipe upstream of a junction of the crankcase ventilation line;
an engine control unit operatively connected to the air mass sensor, the expander, and the internal combustion engine;
the engine control unit configured to detect a power of the internal combustion engine and an air mass flow from the air mass sensor and shut off the expander when the power of the internal combustion engine detected suddenly rises and the air mass flow remains constant to reduce a passing of the combustible working medium from the expander into the internal combustion engine.

20. The drive system of claim 19, wherein the engine control unit is further configured to shut off the expander when the working medium sensor detects the combustible working medium in the power transmission coupling.

\* \* \* \* \*